No. 771,641. PATENTED OCT. 4, 1904.
E. HUBER & T. D. ULRICH.
STRAW STACKER.
APPLICATION FILED JAN. 24, 1903.
NO MODEL.
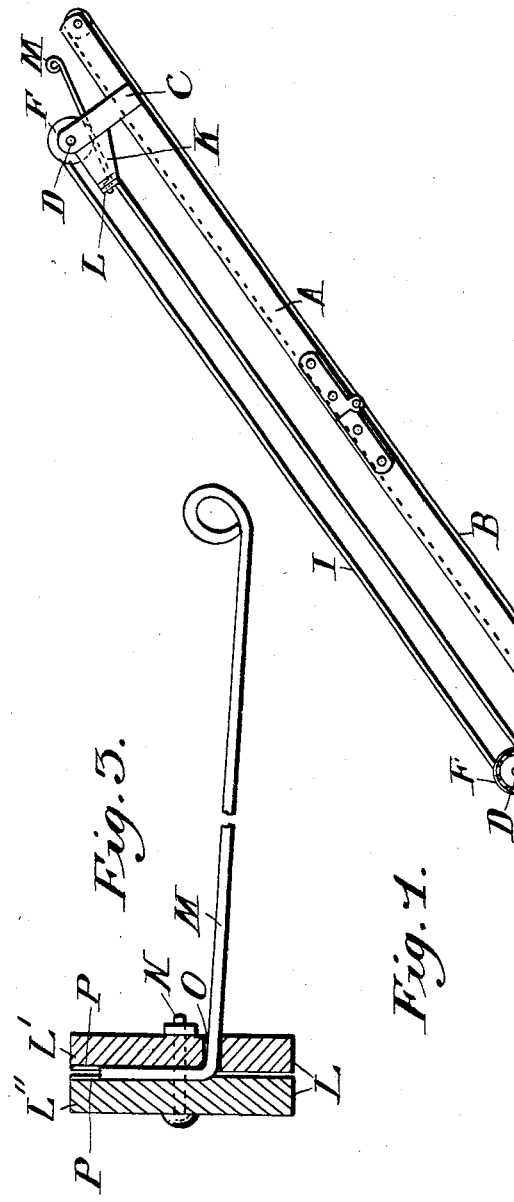
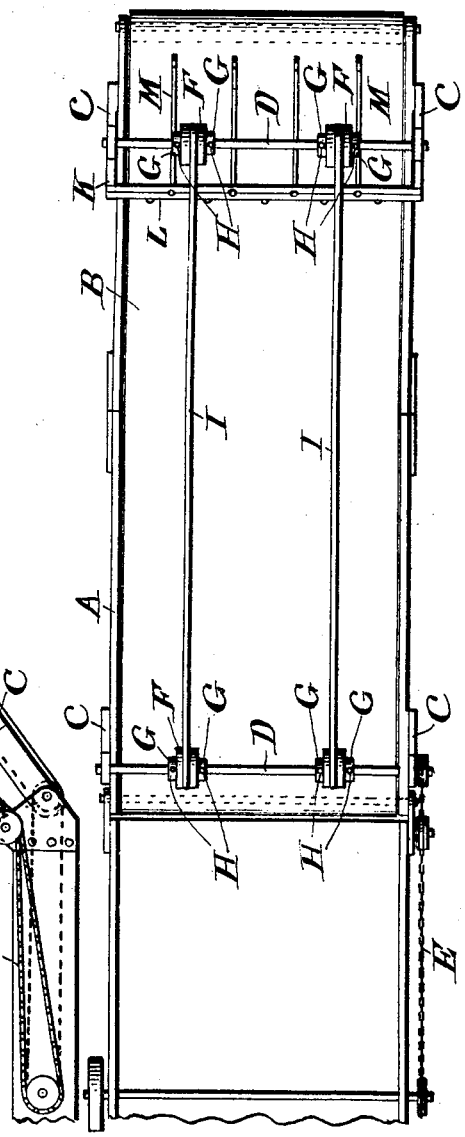

No. 771,641. Patented October 4, 1904.

UNITED STATES PATENT OFFICE.

EDWARD HUBER AND TOMEY D. ULRICH, OF MARION, OHIO.

STRAW-STACKER.

SPECIFICATION forming part of Letters Patent No. 771,641, dated October 4, 1904.

Application filed January 24, 1903. Serial No. 140,422. (No model.)

*To all whom it may concern:*

Be it known that we, EDWARD HUBER and TOMEY D. ULRICH, citizens of the United States, residing at Marion, in the county of Marion and State of Ohio, have invented certain new and useful Improvements in Straw-Stackers, of which the following is a specification.

Our invention relates to endless-belt straw and chaff conveyers to be attached to threshing-machines and used to convey the straw and chaff from the machine to a stack, and has for its object to provide means by which the straw is prevented from tumbling down the carrier-apron or from being blown off the apron in case of high winds.

The advantages of our invention will more fully appear hereinafter and by reference to the accompanying drawings, in which—

Figure 1 is a side view in elevation of a straw-carrier, showing our invention in position; Fig. 2, a top plan view, and Fig. 3 a detail view of the fenders at the delivery end of the conveyer.

Referring to the drawings, in which similar reference characters indicate corresponding parts throughout the several views, A represents the frame of an endless-apron conveyer which is attached in any well-known manner to a threshing-machine and may be formed to fold in three pieces, as shown, or made in any other approved manner, while B represents the carrier-apron mounted in the usual manner in frame A.

C represents uprights secured to the sides of frame A, in which are journaled shafts D, the shaft D at the lower end of the frame A or the part attached to the threshing-machine being driven by means of a chain, belt, or other suitable gearing E.

F represents grooved sheaves keyed or splined to shafts D and adjustable thereon by means of collars G and set-screws H.

I represents endless cables or chains that pass around sheaves F, which are adapted to lie close to the apron B and, the section next to the apron traveling in the same direction as the upper or conveying side of the apron, compress the straw against the apron, thus preventing it tumbling back down or blowing off in case of a high wind. If desired, sprocket-wheels may be substituted for the sheaves F if chains are used instead of cables, this substitution being an obvious one.

Attached to the uprights C at the delivery end of the frame A are brackets K.

L represents a cross-bar connecting the brackets K, which consists of two pieces L' and L'', between which are secured spring-fingers M, N being bolts to secure the two pieces L' and L'' together, while O is one of the holes in L', through which the end of the finger M is received and its upwardly-bent portion *m* held in grooves P.

In the drawings we have illustrated but two cables I; but it will be readily apparent that it might be necessary to increase or decrease the number in some cases where a wide conveyer is used or the condition of the straw demands it.

Having thus described our invention, what we claim is—

1. In a straw-carrier for threshing-machines, a frame, an endless conveyer in said frame, uprights secured to the ends of said frame, shafts journaled in said uprights, sheaves secured to said shafts, and ropes or cables geared to said sheaves, substantially as shown and described.

2. A straw-carrier comprising in combination with a frame, and a conveyer in said frame, uprights secured adjacent to the delivery end of said frame, brackets secured to said uprights, cross-bars connecting said brackets, and spring-fingers mounted on said bars, substantially as shown and described.

3. A straw-carrier comprising in combination with a frame, and a conveyer in said frame, uprights secured adjacent to the ends of said frame, shafts journaled in said uprights, sheaves keyed to said shafts, cables running over said sheaves, brackets secured to the uprights adjacent to the delivery end of the frame, cross-bars secured to said brackets, and spring-fingers mounted on said bars, substantially as shown and described.

In testimony whereof we hereto affix our signatures in the presence of two witnesses.

EDWARD HUBER.
TOMEY D. ULRICH.

Witnesses as to Edward Huber:
SARA W. CUSIC,
W. J. NEIDHART.

Witnesses as to Tomey D. Ulrich:
CLARA MAIER,
F. A. SCHROËTER.